US005668870A

United States Patent [19]
Dahlquist

[11] Patent Number: 5,668,870
[45] Date of Patent: Sep. 16, 1997

[54] AUDIBLE SIGNALING DEVICE FOR INFORMING WHEN A TELEPHONE LINE IS AVAILABLE OR IN USE

[76] Inventor: James E. Dahlquist, 947 Saratoga Dr., Palatine, Ill. 60067

[21] Appl. No.: 587,768

[22] Filed: Dec. 21, 1995

[51] Int. Cl.[6] .................................................. H04M 11/00
[52] U.S. Cl. ........................... 379/377; 379/164; 379/167; 379/382; 379/374
[58] Field of Search ........................... 379/377, 373, 379/375, 376, 33, 21, 164, 165, 167, 168, 387

[56] References Cited

U.S. PATENT DOCUMENTS

| | | |
|---|---|---|
| 2,952,744 | 9/1960 | Semon. |
| 3,665,111 | 5/1972 | Schieser ................................. 379/34 |
| 4,074,081 | 2/1978 | Humm ................................... 379/373 |
| 4,220,825 | 9/1980 | Fahey ..................................... 379/377 |
| 4,317,964 | 3/1982 | Biggs et al. ............................ 379/377 |
| 4,388,501 | 6/1983 | Ahuja ..................................... 379/26 |
| 4,647,723 | 3/1987 | Voorhies ................................ 379/381 |
| 4,935,959 | 6/1990 | Markovic et al. ..................... 379/377 |
| 4,998,271 | 3/1991 | Tortola et al. ......................... 379/377 |
| 5,062,131 | 10/1991 | Kanare et al. ......................... 379/33 |
| 5,140,631 | 8/1992 | Stahl ....................................... 379/377 |
| 5,526,406 | 6/1996 | Luneau ................................... 379/67 |
| 5,533,117 | 7/1996 | Kim ........................................ 379/376 |

Primary Examiner—Krista M. Zele
Assistant Examiner—Jacques M. Saint-Surin
Attorney, Agent, or Firm—Meroni & Meroni

[57] ABSTRACT

A device is provided for connection to a shared telephone line for detecting and audibly indicating the on-hook and off-hook status of the line. The device includes sensing and changing circuitry connected to the shared telephone line for detecting a voltage step occurring during status change transitions between on-hook and off-hook states and correspondingly changing the device during these status changes transitions so that the device is prohibited from drawing power from the shared telephone line when the shared telephone line in not in use. A piezo speaker produces audible on-hook and off-hook sights corresponding to on-hook and off-hook states of the telephone line.

11 Claims, 1 Drawing Sheet

AUDIBLE SIGNALING DEVICE FOR INFORMING WHEN A TELEPHONE LINE IS AVAILABLE OR IN USE

BACKGROUND OF THE INVENTION

1. Field of the Invention

The present invention relates to a telephone equipment. More particularly, the invention pertains to a signaling device for determining whether a telephone line is in an on-hook or off-hook condition.

2. Description of the Prior Art

It is common in both business and residential settings to connect more than one telephone or device to a common telephone line. The indication of the shared telephone line being in an in-use or available state has traditionally been accomplished by repeatedly picking up the telephone and listening for a dial tone to indicate that the line was available. This type of arrangement is both tedious for the user waiting for the line to become available and creates annoyance to the user currently utilizing the line.

Various prior art devices and circuits are known in the art for detection of on-hook and off-hook conditions of a telephone line. However, these devices suffer in a number of regards. For example, many of such devices utilize complex or costly circuitry that is often directed for use with large telephone or switching systems. While others, require batteries or external power to operate, and rely on visual indicators to indicate line status which leads to both increased maintenance or installation and the repeated checking of the visual indicators by a user.

A more desirable device is one which would be simple and inexpensive and provide an improved manner of signaling that would not require repeated checking by a user. An additional desirable feature is one which would not require batteries or external power, but at the same would comply with the direct current requirements of the Federal Communications Commission.

As will be described in greater detail hereinafter, the device and circuit of the present invention differs from those previously proposed and employs a number of novel features that render it highly advantageous over the prior art.

SUMMARY OF THE INVENTION

Accordingly, it is an object of this invention to provide a device for immediately notifying a user of the availability of a line without the user having to repeatedly check a visual indicator.

Another object of this invention is to provide a device requiring no external power or batteries while at the same time complying with the direct current requirements of the Federal Communications Commission.

Still another object of this invention is to provide a device that is simple, inexpensive, and easy to install.

To achieve the foregoing and other objectives, and in accordance with the purposes of the present invention a device is provided for connection on a shared telephone line for detecting and audibly indicating the on-hook and off-hook status of the shared telephone line. The device includes sensing and charging means connected to the shared telephone line for detecting a voltage step occurring during status change transitions between on-hook and off-hook states and correspondingly charging the device during these status changes transitions so that the device is prohibited from drawing power from the shared telephone line when the shared telephone line in not in use. Output means are connected to the sensing and charging means for producing audible on-hook and off-hook signals corresponding to on-hook and off-hook states of the telephone line.

In accordance with an aspect of the invention, the output means includes means for producing an oscillating signal connected to a piezo speaker.

Other objects, features and advantages of the invention will become more readily apparent upon reference to the following description when taken in conjunction with the accompanying drawing.

DETAILED DESCRIPTION OF THE PREFERRED EMBODIMENT

Figure 1:
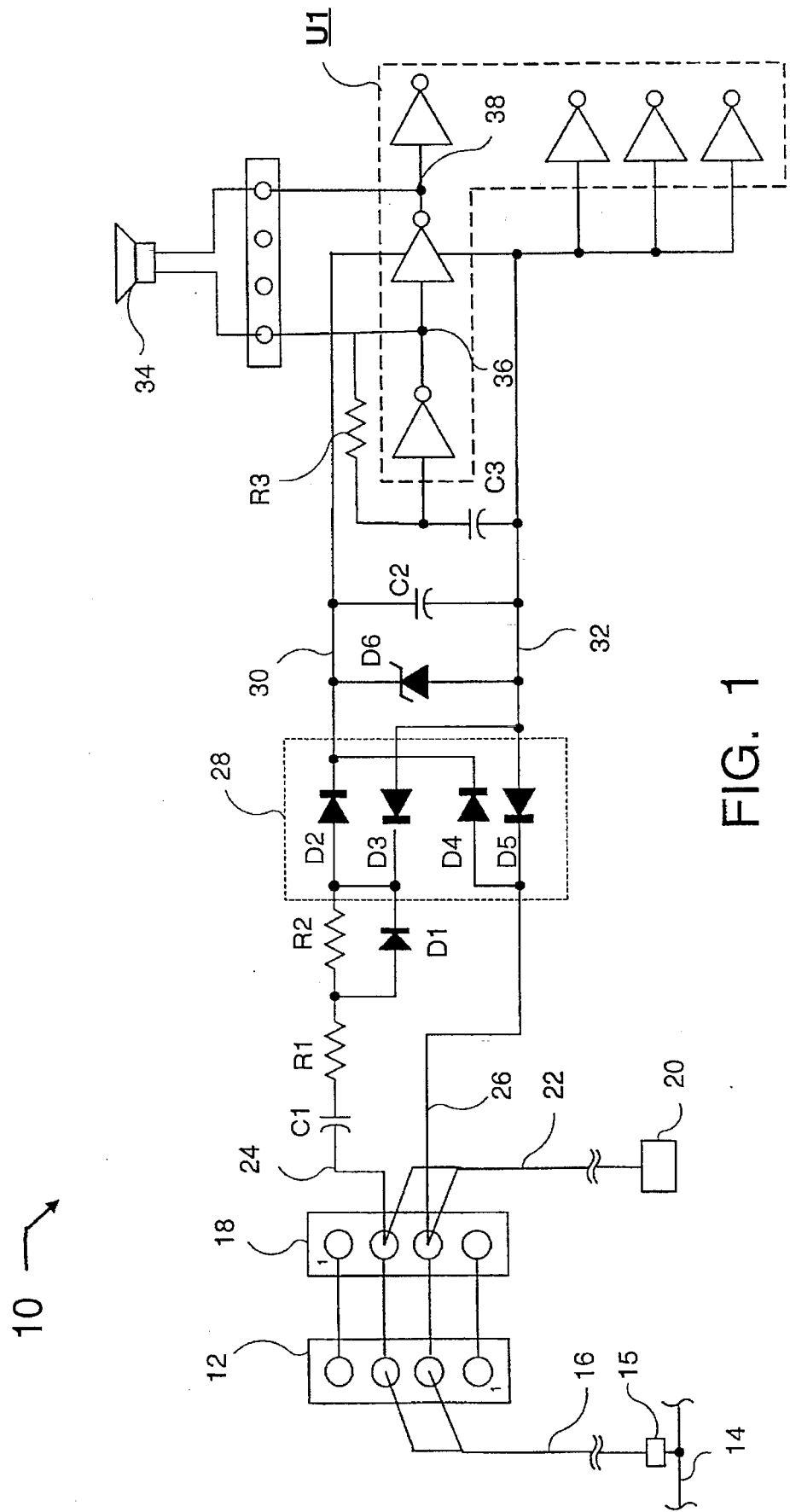
FIG. 1 is a schematic circuit diagram in accordance with the present invention.

Referring now to the drawing, a telephone line signaling circuit and device 10 is illustrated schematically in FIG. 1. The device 10 is shown in a typical application where the device is a stand-alone device easily plugged in-line with a telephone 20 in a modular system.

The device 10 has modular jack 12 for connection to a common or shared telephone line 14 with extension telephone line 16 and wall jack 15. Modular jack 18 provides interconnection of the device 10 to the telephone 20 with extension telephone line 22. The modular jacks 12, 18 connect the device 10 to the tip 24 and ring 26 lines of the telephone line 14. Outer lines of the modular jacks 12, 18 can provide a path for a second telephone or device, but are not intended as part of the invention.

The circuitry of the device 10 in a preferred embodiment includes a first capacitor C1 for sensing voltage changes between on-hook and off-hook states of the telephone line 14. A first resistor R1 is connected in series to the first capacitor C1. The first capacitor C1 is preferable a metalized polyester capacitor at 1 uf and 250 vdc. A second resistor R2 is connected in series to the first resistor R1 with a first diode D1 connected in parallel to the second resistor R2.

A bridge rectifier circuit 28 for rectifying voltage includes second diode D2, third diode D3, fourth diode D4, and fifth diode D5. The bridge rectifier circuit 28 is connected to the second resistor R2 and first diode D1 and includes first output line 30 and second output line 32. A zener diode D6 for regulating voltage is connected in parallel between the first output line 30 and the second output line 32. A second capacitor C2 is connected in parallel to the zener diode D6. A piezo speaker 34 produces auditory signals corresponding to on-hook and off-hook states of the telephone line 14. A piezo speaker 34 is preferably a piezo transducer at 90 DB, 3.75 KHZ, and 5 vpp.

In operation, when a remote telephone goes on-hook or off-hook, there will be a step in voltage across the line from approximately 48 volts down to approximately 8 volts. This large step in voltage will cause a charging or discharging current to go through the first capacitor C1. In one polarity, the charging and discharging current is required to go through first resister R1, and in the opposite polarity through the first resister R1 and the second resister R2. In the opposite polarity, first diode D1 will be conducting and a higher current will be available to only the first resister R1. By adjusting the values of resisters R1 and R2, one can adjust the relative magnitude and sound of the two status portable signals.

The polarity is then converted by the bridge rectifier circuit 28 to a forward voltage that is limited to a safe magnitude by the zener diode D6, which is typically a value of 5 or 6 volts. Second capacitor C2 maintains a stable voltage for the integrated circuit chip U1. U1 is a hex inverting schmitt trigger integrated circuit chip of conventional design, such as the 74HCT14, with hysteresis so that whenever voltage is applied to power the chip, the output from PIN 36 will go through a third resister R3 and charge a third capacitor C3 and reverse the input causing the output to reverse and then discharge the third capacitor C3. In other words, it creates an oscillating signal. That oscillating signal is inverted by the second stage which outputs at PIN 38. The piezo speaker 34 is connected across PIN 36 and PIN 38 so that it will get the benefit of a positive push/pull electrical signal allowing for a doubling the voltage so that the piezo speaker 34 will create an adequate amount of sound from the small amount of energy that is available from the charging and discharging of the first capacitor C1. The other stages of the device have their inputs grounded for safety but have no function in the design.

In use, the device will produce two audibly distinct status signals. To test if the telephone line 14 is in use initially and with a minimal disturbance, one can briefly pick up and hang up the telephone 20. If the user does not hear an "in use" signal or tone followed by an "available" signal, then the telephone line 14 is in use. An "available" signal will be produced when the line 14 is free again, as well as producing an "in use" signal should the telephone line 14 be again in use.

It should be understood that the device may be used as a small stand alone device plugged into an existing system or may be formed integral with the telephone 20 by simply connecting the tip 24 and ring 26 lines of the device to the corresponding lines of the telephone for connection to the tip and ring lines of the telephone line 14. Since the present device 10 will produce an electronic ringing sound in response to incoming ring signals, the device 10 could be used to replace the existing ringer circuitry of the telephone 20.

It is important to note this device 10 only takes power from the telephone line 14 during the transitions, or in other words during the voltage steps up or down because of the telephone going on-hook or off-hook. Hence, power is obtained without taking direct current in order to comply with the direct current requirements of the Federal Communications Commission.

Although the invention has been described by reference to some embodiments it is not intended that the novel device be limited thereby, but that modifications thereof are intended to be included as falling within the broad scope and spirit of the foregoing disclosure, the following claims and the appended drawing.

I claim:

1. A line-powered telephone line signaling circuit and device for detecting and indicating the on-hook and off-hook status of a telephone line, comprising:
   (a) circuit connector means for connection into the telephone line;
   (b) a first capacitor for sensing voltage changes between on-hook and off-hook states of the telephone line;
   (c) a first resistor connected in series to said first capacitor;
   (d) a second resistor connected in series to said first resistor;
   (e) a first diode connected in parallel to said second resistor;
   (f) a bridge rectifier circuit including a second diode, third diode, fourth diode, and fifth diode, the bridge rectifier circuit connected to said second resistor and first diode and having a first output line and a second output line;
   (g) a zener diode connected in parallel between the first output line and the second output line;
   (h) a second capacitor connected in parallel to the zener diode; and
   (i) output means connected in parallel to the second capacitor for producing auditory signals corresponding to on-hook and off-hook states of the telephone line, the output means being powered by telephone line voltage transitions occurring between on-hook and off-hook states of the telephone line which are electrically conveyed from the first capacitor.

2. The circuit and device of claim 1, wherein the output means includes means for producing an oscillating signal connected to a piezo speaker.

3. The circuit and device of claim 2, wherein the means for producing an oscillating signal includes a circuit inverter means coupled with a third capacitor and a third resistor for producing a push/pull electrical signal having its respective voltage doubled for actuating the piezo speaker from voltage of the telephone line at voltage steps occurring during status change transitions between on-hook and off-hook states.

4. A line-powered device for connection on a shared telephone line for detecting and audibly indicating the on-hook and off-hook status of the shared telephone line, the device comprising:
   (a) sensing and charging means connected to the shared telephone line for detecting a voltage step occurring during status change transitions between on-hook and off-hook states and correspondingly charging the device during these status changes transitions so that the device is prohibited from drawing power from the shared telephone line when the shared telephone line in not in use; and
   (b) output means connected to the sensing and charging means for producing audible on-hook and off-hook signals corresponding to on-hook and off-hook states of the telephone line, the output means being powered by telephone line voltage transitions occurring between on-hook and off-hook states of the telephone line which are electrically conveyed from a capacitor of the sensing and charging means.

5. The device of claim 4, wherein the device is formed in combination with a telephone.

6. A line-powered device for connection on a shared telephone line for detecting and audibly indicating the on-hook and off-hook status of the shared telephone line, the device comprising:
   (a) sensing and charging means connected to the shared telephone line for detecting a voltage step occurring during status change transitions between on-hook and off-hook states and correspondingly charging the device during these status changes transitions so that the device is prohibited from drawing power from the shared telephone line when the shared telephone line in not in use;
   (b) means for rectifying voltage connected to said sensing and charging means;
   (c) means for regulating voltage connected to said rectifying means; and
   (d) output means connected to the regulating means for producing audible on-hook and off-hook signals corresponding to on-hook and off-hook states of the telephone line, the output means being powered by telephone line voltage transitions occurring between on-hook off-hook states of the telephone line which are electrically conveyed from a capacitor of the sensing and charging means.

7. The device of claim 6, wherein the output means includes means for producing an oscillating signal connected to a piezo speaker.

8. The device of claim 6, wherein the device is formed in combination with a telephone.

9. The device of claim 7, wherein the means for producing an oscillating signal includes a circuit inverter means for producing a push/pull electrical signal having its respective voltage doubled for actuating the piezo speaker during said status change transitions of the sensing and charging means.

10. A telephone line signaling circuit and device for detecting and indicating the on-hook and off-hook status of a telephone line, comprising:

(a) circuit connector means for connection into the telephone line;

(b) a first capacitor for sensing voltage changes between on-hook and off-hook states of the telephone line;

(c) a first resistor connected in series to said first capacitor;

(d) a second resistor connected in series to said first resistor;

(e) a first diode connected in parallel to said second resistor;

(f) a bridge rectifier circuit including a second diode, third diode, fourth diode, and fifth diode, the bridge rectifier circuit connected to said second resistor and first diode and having a first output line and a second output line;

(g) a zener diode connected in parallel between the first output line and the second output line;

(h) a second capacitor connected in parallel to the zener diode; and (i) output means connected in parallel to the second capacitor for producing auditory signals corresponding to on-hook and off-hook states of the telephone line, the output means including means for producing an oscillating signal connected to a piezo speaker, the means for producing an oscillating signal includes a circuit inverter means coupled with a third capacitor and a third resistor for producing a push/pull electrical signal having its respective voltage doubled for actuating the piezo speaker from voltage of the telephone line at voltage steps occurring during status change transitions between on-hook and off-hook states.

11. A device for connection on a shared telephone line for detecting and audibly indicating the on-hook and off-hook status of the shared telephone line, the device comprising:

(a) sensing and charging means connected to the shared telephone line for detecting a voltage step occurring during status change transitions between on-hook and off-hook states and correspondingly charging the device during these status changes transitions so that the device is prohibited from drawing power from the shared telephone line when the shared telephone line in not in use;

(b) means for rectifying voltage connected to said sensing and charging means;

(c) means for regulating voltage connected to said rectifying means; and (d) output means connected to the regulating means for producing audible on-hook and off-hook signals corresponding to on-hook and off-hook states of the telephone line, the output means including means for producing an oscillating signal connected to a piezo speaker, the means for producing an oscillating signal including a circuit inverter means for producing a push/pull electrical signal having its respective voltage doubled for actuating the piezo speaker during said status change transitions of the sensing and charging means.

* * * * *